(12) United States Patent
Dees et al.

(10) Patent No.: US 6,287,247 B1
(45) Date of Patent: Sep. 11, 2001

(54) CONTAINERS FORMED OF A COMPOSITE PAPERBOARD WEB AND METHODS OF FORMING THE SAME

(75) Inventors: Jerome G. Dees, Appleton, WI (US); Kirk Kimbel, Cincinnati, OH (US)

(73) Assignee: Fort James Corporation, Deerfield, IL (US)

( * ) Notice: Subject to any disclaimer, the term of this patent is extended or adjusted under 35 U.S.C. 154(b) by 0 days.

(21) Appl. No.: 09/519,663

(22) Filed: Mar. 6, 2000

Related U.S. Application Data

(62) Division of application No. 08/975,059, filed on Nov. 20, 1997, now Pat. No. 6,039,682, which is a continuation of application No. 08/736,353, filed on Oct. 23, 1996, now abandoned.

(51) Int. Cl.$^7$ ........................................................ B31B 1/88
(52) U.S. Cl. .................................. 493/58; 493/84; 493/89
(58) Field of Search ..................................... 493/68, 84, 89, 493/93, 95, 110, 128, 141, 150, 158, 210, 334, 374, 379, 386, 381, 391, 58; 229/122, 403, 406, 407; 220/674

(56) References Cited

U.S. PATENT DOCUMENTS

| | | |
|---|---|---|
| Re. 9,948 | 11/1881 | Long . |
| Re. 33,143 | 1/1990 | Grone . |
| D. 271,650 | 12/1983 | Groenewold et al. . |
| 1,513,543 | 10/1924 | Fritsche . |
| 1,523,702 | 1/1925 | Moeller et al. . |
| 1,537,848 | 5/1925 | MacDonald . |
| 1,750,204 | 3/1930 | Wichner . |
| 2,090,435 | 8/1937 | Waldvogal . |
| 2,206,406 | 7/1940 | Koch . |
| 2,502,113 | 3/1950 | Walker . |
| 2,597,715 | 5/1952 | Erikson . |
| 2,622,051 | 12/1952 | Hermanson et al. . |
| 2,853,222 | 9/1958 | Gallagher . |
| 3,082,900 | 3/1963 | Goodman . |
| 3,237,834 | 3/1966 | Davis et al. . |
| 3,456,860 | 7/1969 | Janninck . |
| 3,737,093 | 6/1973 | Amberg et al. . |
| 3,868,056 | 2/1975 | Keren . |
| 3,908,523 | 9/1975 | Shikaya . |
| 4,349,124 | * 9/1982 | Faller . |
| 4,507,348 | 3/1985 | Nagata et al. . |
| 4,721,499 | 1/1988 | Marx et al. . |
| 4,968,530 | 11/1990 | Yamane et al. . |
| 4,993,580 | 2/1991 | Smith . |

(List continued on next page.)

*Primary Examiner*—Eugene Kim
(74) *Attorney, Agent, or Firm*—Nixon Peabody LLP; Jeannie Saxton

(57) ABSTRACT

Composite paperboard containers formed from a first substantially planar sheet of paperboard material having a content contacting surface and a back surface, a first embossed sheet of paperboard material having a plurality of raised portions adhered to the back surface of the first planar sheet and a second embossed sheet of paperboard material having a plurality of raised portions adhered to the first embossed sheet of paperboard material. Additional planar sheets or embossed sheets may be added as desired in order to achieve the desired flexural stiffness and thermal resistance. Such containers being in the form of cups, plates, bowls or trays and formed by providing the substantially planar sheet of paperboard material, forming the planar sheet of paperboard material into a container shell, providing a first embossed sheet of paperboard material having raised portions and adhering the raised portions of the first embossed sheet of paperboard material to the planar sheet of paperboard material, providing a second embossed sheet of paperboard material having raised portions and adhering the raised portions of the second embossed sheet of paperboard material to the first embossed sheet of paperboard material. Alternatively, the embossed sheets of paperboard material may be previously adhered to one another and subsequently adhered to the planar sheet of paperboard material.

17 Claims, 9 Drawing Sheets

U.S. PATENT DOCUMENTS

| | | |
|---|---|---|
| 5,002,186 | 3/1991 | Cooper . |
| 5,092,485 | 3/1992 | Lee . |
| 5,203,491 | 4/1993 | Marx et al. . |
| 5,230,939 | 7/1993 | Baum . |
| 5,316,622 | 5/1994 | Babinsky et al. . |
| 5,326,020 | 7/1994 | Cheshire et al. . |
| 5,363,982 | 11/1994 | Sadlier . |
| 5,374,468 | 12/1994 | Babinsky et al. . |
| 5,766,709 | 6/1998 | Geddes et al. . |
| 5,769,311 * | 6/1998 | Morita et al. .......................... 229/403 |
| 6,039,682 * | 3/2000 | Dees et al. ............................. 493/58 |

\* cited by examiner

CONTAINERS FORMED OF A COMPOSITE PAPERBOARD WEB AND METHODS OF FORMING THE SAME

CROSS REFERENCE TO RELATED APPLICATION

This application is a Divisional of application Ser. No. 08/975,059 filed Nov. 20, 1997, now U.S. Pat. No. 6,039,682, which itself is a Continuation of application Ser. No. 08/736,353, filed Oct. 23, 1996, now abandoned.

TECHNICAL FIELD

The present invention is directed to paperboard containers formed from a composite web and more particularly to the formation of containers formed from layer embossed paperboard sheets and methods of forming such containers.

BACKGROUND OF THE INVENTION

It is well known in the art to form disposal containers such as cups, bowls, plates or trays from a variety of material, particularly from paper, expanded resins or polystyrene. In this regard, polystyrene containers are aesthetically pleasing, however, they can only be used for holding cold products and are not biodegradable or recyclable. Containers formed of expanded synthetic resin material have found wide acceptance in that the material is an excellent thermal insulator such that the containers can maintain the temperature of the food product whether hot or cold for long periods of time. However, as with polystyrene, such containers are not environmentally friendly in that they are not biodegradable or recyclable. As a result, many municipalities and establishments are turning away from the use of such material.

Standard single layer paper containers are recyclable and are therefore environmentally sound. However, because the single layer paper container is a poor insulator, any food product placed in such container will quickly achieve ambient temperature, thus losing any heat or coolness associated with the product. Moreover, when handling extremely hot or cold food products, such food products are uncomfortable to handle with single layer paper containers. Particularly, any hot food product placed in a single layer container may burn the consumer whereas a cold food product will cause condensation on the outside of the container making them slippery and difficult to handle. Furthermore, while the single layer construction is very inexpensive, such containers are fragile and can easily lose their shape when being used.

In an effort to overcome the aforementioned shortcomings, numerous multi-layer containers have been developed.

U.S. Pat. No. 3,908,523 issued to Shikaya is directed to a multi-layer container wherein as at least one layer of the container is a corrugated layer. However, when manufacturing containers such as cups which require the formation of a brim curl or other formation of an upper periphery of the container, the flexibility of corrugated paperboard is limited. Accordingly, the versatility of containers formed utilizing such corrugated layers is limited.

In an effort to overcome the aforementioned shortcomings, U.S. Pat. No. 5,092,485 issued to Lee discloses a paper container formed of multiple layers wherein an internal layer is similarly formed of corrugations. In order to overcome the problems encountered in forming the brim about an upper periphery of the container, the container of the '485 patent is formed from three distinct layers including an outer shell, a middle corrugated layer and an inner shell having a brim curl previously formed thereon. Clearly, such container requires minimal tolerance between the layers and consequently increases manufacturing costs. Moreover, the container continues to falter by being extremely rigid in one direction while being extremely pliable in the direction parallel to the corrugations.

In yet another effort to overcome the aforementioned shortcomings associated with prior containers, U.S. Pat. No. 3,363,982 issued to Sadlier discloses a multi-layer insulated container formed from a continuous sheet. Therein, the container is formed from a sheet having a first layer and third layers of greater dimensions than that of the corrugated central layer such that the inner and outer layers may readily receive a bottom portion and such that the brim curl can more readily be formed about an upper periphery of the container. While such a container, in fact, overcomes a number of the shortcomings associated with the prior art containers, this container still falters in that the container lacks substantial stability in the direction parallel to the corrugations.

Moreover, with each of the above-noted containers, while containers in the form of cups can be readily formed, containers having other configurations such as plates, bowls or trays are not readily formed in the manner set forth therein. Accordingly, the teachings of the aforementioned prior art containers are not readily adaptable to the formation of various types of containers.

In yet a further effort to overcome these shortcomings, an embossed or dimpled combined paperboard product is disclosed in each of U.S. Pat. Nos. 5,316,622 and 5,374,468 issued to Babinsky et al. Therein, embossed or dimpled combined paperboard product is formed wherein an inner layer of embossed material is sandwiched between two substantially planar layers of paperboard material of substantially the same thickness. These combined layers form a paperboard product of greater thickness and rigidity than that of a conventional three-ply board, however, this paperboard product as well as the method of manufacturing such product is highly suitable for the formation of paperboard boxes, however, such a product is not readily suitable for the formation of containers such as cups, plates, bowls or trays.

Clearly, there is a need for a composite paperboard material formed of layers of lightweight paper in which one or more of the layers are heavily embossed such that the composite paperboard can be used in the formation of cups, plates, bowls or trays which may be readily formed from the composite material.

SUMMARY OF THE INVENTION

A primary object of the present invention is to overcome the aforementioned shortcomings associated with the prior art containers.

Yet another object of the present invention is to provide a container which resists bending while providing thermal insulation.

A still further object of the present invention is to provide a composite paperboard material which can accommodate bends or curves in products such as cups, plates, bowls or trays.

Yet another object of the present invention is to provide methods of manufacturing cups, plates, bowls or trays from a composite paperboard material without destroying the inherent stiffness of the composite web.

A still further object of the present invention is to provide a composite web which includes air gaps between the layers of the composite structure to produce a thermal resistance significantly higher than that of a solid board made of an equivalent amount of material.

Yet another object of the present invention is to provide a composite paperboard material exhibiting high flexural stiffness as well as low buckling resistance of lightweight paper.

Another object of the invention is to provide methods of manufacturing paperboard cups, plates, bowls or trays from the composite paperboard material wherein the containers are formed by laminating separate layers around a mandrel or in a die in the form of the container desired.

These, as well as additional objects of the present invention, are achieved by providing a composite paperboard container including a first substantially planar sheet of paperboard material having a content contacting surface and a back surface, a first embossed sheet of paperboard material having a plurality of raised portions adhered to the back surface of the first planar sheet and a second embossed sheet of paperboard material having a plurality of raised portions adhered to the first embossed sheet of paperboard material. Additional planar sheets or embossed sheets may be added as desired in order to achieve the desired flexural stiffness and thermal resistance. Such containers being in the form of cups, plates, bowls or trays and formed by providing the substantially planar sheet of paperboard material, forming the planar sheet of paperboard material into a container shell, providing a first embossed sheet of paperboard material having raised portions and adhering the raised portions of the first embossed sheet of paperboard material to the planar sheet of paperboard material, providing a second embossed sheet of paperboard material having raised portions and adhering the raised portions of the second embossed sheet of paperboard material to the first embossed sheet of paperboard material. Alternatively, the embossed sheets of paperboard material may be previously adhered to one another and subsequently adhered to the planar sheet of paperboard material. Additionally, the planar sheet of paperboard material and embossed sheets of planar material may be formed of a single unitary blank of a length equal to approximately three standard cup blanks with the first one-third of the blank being substantially planar and the remaining two-thirds of the blank being embossed such that when the blank is formed into a cup or cup like structure, a substantially planar sheet forms an interior of the container.

These, as well as additional advantages of the present invention, will become apparent from the following detailed description of the invention when read in light of the several figures.

DETAILED DESCRIPTION OF THE INVENTION

Figure 1:
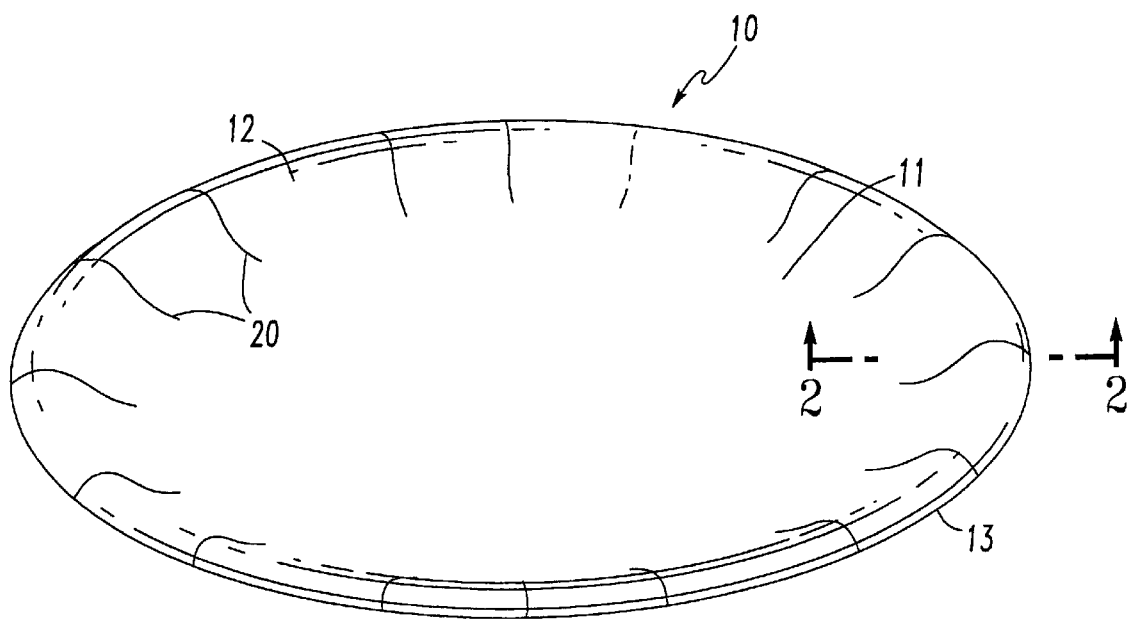
FIG. 1 is a perspective view of a substantially planar container formed in accordance with the present invention.
Figure 3:
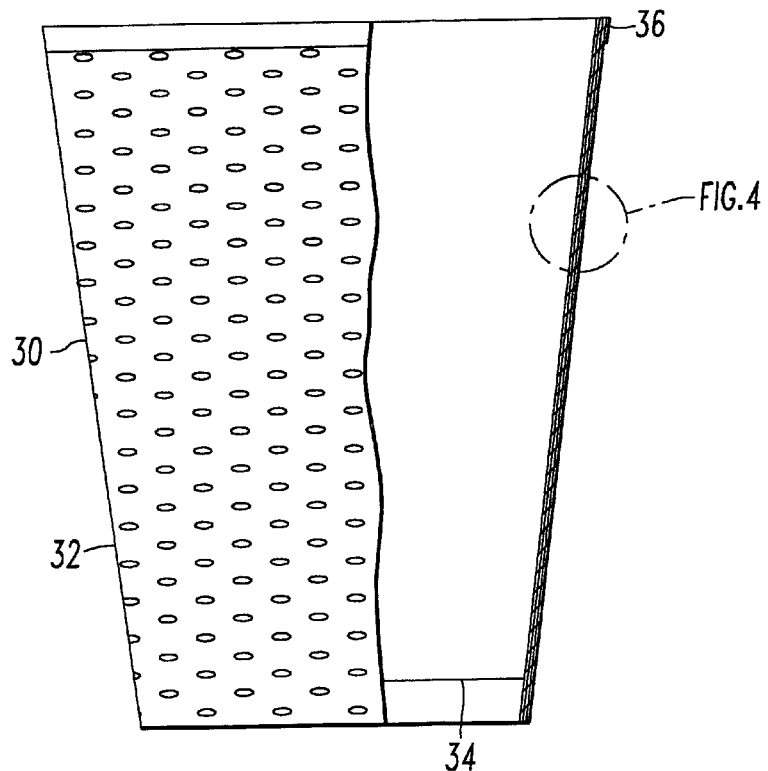
FIG. 3 is an elevational view of an alternative container formed in accordance with the present invention.

Referring now to the several figures and particularly, FIGS. 1 and 3, these figures illustrate containers which are preferably formed in accordance with the present invention. As discussed hereinabove, the present invention is directed to the formation of paperboard cups, plates, bowls or trays from a composite paperboard material wherein the containers are formed by laminating separate layers to one another in the form of the desired container. Again, with reference to FIGS. 1 and 3, the containers illustrated therein are plates and cups which will be described in detail hereinbelow.

Figure 2:
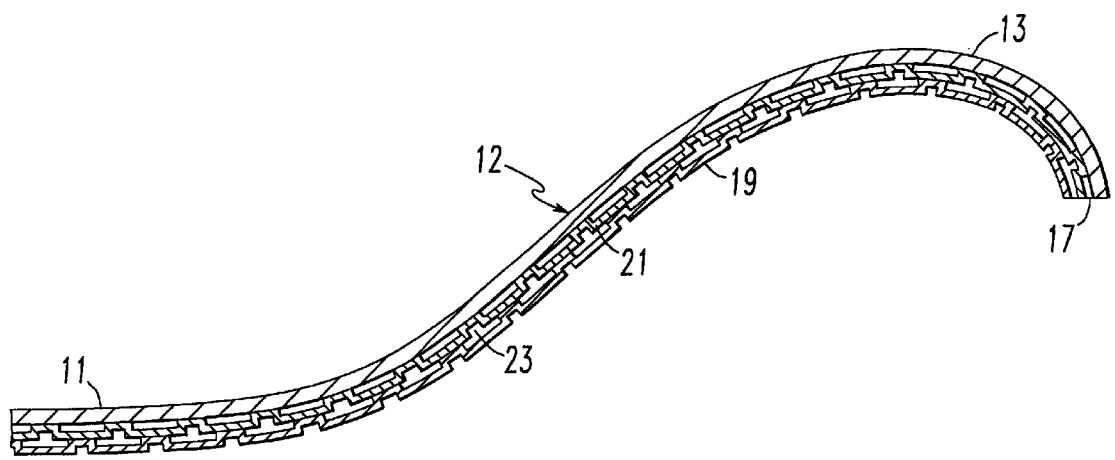
FIG. 2 is a cross-sectional view of a portion of the container illustrated in FIG. 1.

Initially, plates formed in accordance with the present invention take on the configurations substantially similar to that illustrated in FIG. 1 an include a substantially planar bottom portion 11, a sloping side wall portion 12, as well as an inverted flange 13. As with conventional plate configurations, the side wall portion 12 and flange 13 include a plurality of pleats 20 substantially equally spaced about the periphery of the plate. These pleats may be prescored in order to dictate the pleat locations wherein excess material of the paperboard blank is taken up during the pressing of the paperboard blank in a forming die as will be discussed in greater detail hereinbelow. With reference now to FIG. 2, it can be readily appreciated that the plate 10 illustrated in FIG. 1 is formed of three distinct lamented layers. The first being an unembossed paper blank 17, a first embossed layer 21 which is laminated to an under surface of the blank 17 and, a second embossed blank 19 which is laminated to an under surface of the first embossed blank 21. The particular manipulative steps of forming the plate of FIGS. 1 and 2 will be discussed in greater detail hereinbelow.

Figure 4:
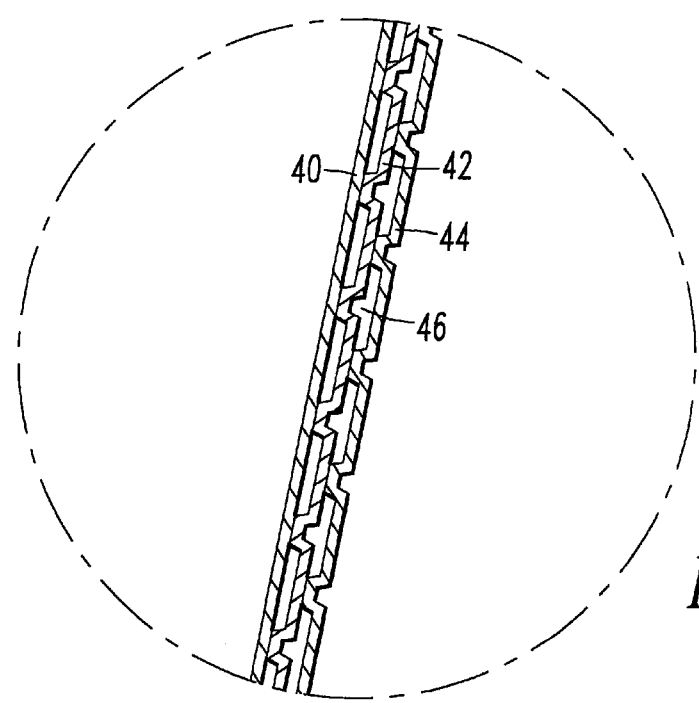
FIG. 4 is a cross-sectional view of a portion of the container illustrated in FIG. 3.

With reference now to FIGS. 3 and 4, FIG. 3 illustrates a cup which may be readily formed in accordance with the present invention. The cup 30 includes a tapered side wall 32 which is formed of multiple layers as will be discussed in detail hereinbelow as well as a bottom wall 34. A portion of the cup 30 may include either an over turned flange 36 or brim curl as is readily known in the art.

With reference to FIG. 4, the encircled section A of FIG. 3 is illustrated in an expanded form. As can be seen from FIG. 4, the cup 30 includes an inner layer 40 of a substantially planar unembossed paperboard material, a first embossed layer of paperboard material 42 lamented to an outer surface of the layer 40 and a second embossed layer of paperboard material 44 laminated to an outer surface of the layer 42. The specific configuration, manufacture and process of forming the cup 30 in accordance with the present invention will be discussed in greater detail hereinbelow.

Each of the containers 10 and 30 are formed of a composite web formed of layers of conventional paper material with each layer having a basis weight in the range of approximately 20 to 80 lbs. per 3000 sq. ft. ream and preferably in a range of approximately 30 to 50 lbs. per 3,000 square foot ream in which, as discussed hereinabove, a layer of planar unembossed paper is bonded to layers of heavily embossed paper. While each of the above noted containers are formed of three layers, any number or combination of embossed and unembossed layers may be utilized in order to achieve a desired rigidity and/or thermal insulation. Further, any desired embossed configuration may be utilized to achieve the most beneficial results for the particular container being formed.

As has been found by the inventors, the composite paperboard structure makes use of the "I-beam" effect by moving material away from the neutral axis of bending. As noted hereinabove, the tips of the embossed layers are bonded to an adjacent layers such that the layers are connected and thereby work as a single unit. The "I-beam" effect creates a composite paperboard with significantly higher bending stiffness than can be achieved from a solid paperboard sheet make of an equivalent amount of material. When the composite paperboard is flexed, the first and last layers carry a majority of the tension and compression forces generated similar to that which occurs with the top and bottom flanges of an I-beam. In this regard, the embossed areas act as the vertical section of the I-beam and carry a majority of the shear forces due to bending, thus the embossed layers of the composite board serve a dual purpose in that the embossed areas carry shear forces while the unembossed areas act as skins to carry tension and compression forces. A calculation of the bending stiffness of a sample composite paperboard structure formed in accordance with the present invention and that of a solid paperboard structure of the same thickness is set forth in detail hereinbelow for comparison.

Bending stiffness for paperboard equal EI where:

E=modules of Elasticity

I=moment to Inertia accordingly, for a three layer composite embossed paperboard sheet;

$$I_E = \frac{x(bt^3)}{12} + 2Ad^2$$

where;

x=Number of layers (3 layers)

b=Sample width (assumed 1.00 inches)

t=Thickness of each layer (assume 0.0035 inches)

A=Cross-sectional area of top and bottom layers d=Distance of top and bottom layer to the neutral axis (assume 0.025 inches) therefore;

$$I_E = \frac{3(1)(.0035)^3}{12} + 2(.0035)(1)(.025)^2$$
$$= 4.38 \times 10^{-6} \text{ in}^4.$$

For a solid paperboard sheet of equivalent thickness;

$$I_s = b(xt)^3$$

where;

x=number of layers (3 layers)

b=sample width (assumed 1.00 inches)

t=thickness of each layer (assumed to be 0.0035 inches)

therefore;

$$I_S = \frac{(1)[(3)(.0035)]^3}{12}$$
$$= 9.64 \times 10^{-8} \text{ in}^4$$

Accordingly, the bending stiffness ratio equals $$\frac{EI_E}{EI_S} = \frac{4.38 \times 10^{-6}}{9.64 \times 10^{-8}} = 45$$

Clearly, one of ordinary skill in the art can readily appreciate the significance resistance to bending achieved in accordance with the present invention.

In addition to the foregoing, the embossed areas of the composite board may be arranged in any desired configuration in order accommodate bends or curves in the products being formed such as cups, plates, bowls or trays. As discussed hereinabove, a major deterrent to using corrugated board in these types of products is that the fluted medium is oriented in only a single direction with interferes with bends or curves in the product in an opposing direction. Accordingly, the arrangement and size of the embossed areas set forth in accordance with the present invention may be varied in order to form a composite paperboard material which may be either directional or non-directional which is dictated by the particular application of the composite material.

As may be readily appreciated from each of FIGS. 2 and 4 set forth hereinabove, the lamination of the several layers of the paperboard material to one another forms a plurality of air gaps 23 and 46, respectively, in the formed container. These air gaps between the layers of the composite paperboard material produce a thermal resistance significantly higher than that which would be achieved by a solid board made of an equivalent amount of material. The advantage of the thermal resistance of this sample composite paperboard structure as compared to that of a solid board is set forth in detail hereinbelow.

Thermal resistance for paperboard equals the thickness of the board divided by its thermal conductivity and surface area;

$$R = \frac{h}{kA}$$

$h$ = total thickness $A$ = surface area $k$ = 0.050 BTU/hr.ft. ° F. for solid paperboard $k$ = 0.0165 BTU/hr.ft. ° F. for air Therefore, for a composite embossed paperboard sheet assuming 0.050 inches of air thickness;

$$R_E = \frac{(0.050)/12}{0.0165(1 \text{ ft}^2)}$$
$$= 2.52 \times 10^{-1} \text{ hr. ° F./BTU}$$

for a solid paperboard sheet;

$$R_S = \frac{[(0.0035)(3)]/12}{0.050(1\,\text{ft}^2)}$$

$$= 1.75 \times 10^{-2} \text{ hr. } °\text{F./BTU}$$

Accordingly, the thermal resistance ratio of the sample as compared to a solid paperboard sheet equals $$\frac{R_E}{R_S} = \frac{2.52 \times 10^{-1}}{1.75 \times 10^{-2}} = 14.4$$

Clearly, one of ordinary skill in the art can readily appreciate the significant thermal resistance achieved in accordance with the present invention. Accordingly, due to the higher thermal resistance of the composite paperboard material, this material is readily suited with a formation of products such as cups for drinking hot or cold liquids, hot food plates and other types of containers for hot or cold food.

Due to the high flexural stiffness of the composite paperboard material and low buckling resistance, the light weight paper utilized in forming the composite paperboard material, many structures such as paper cups and plates are not readily formed by the finished composite paperboard. Consequently, the following is a detailed discussion of the method for forming such paperboard cups and container without destroying the integrity of the composite material.

Figure 5:
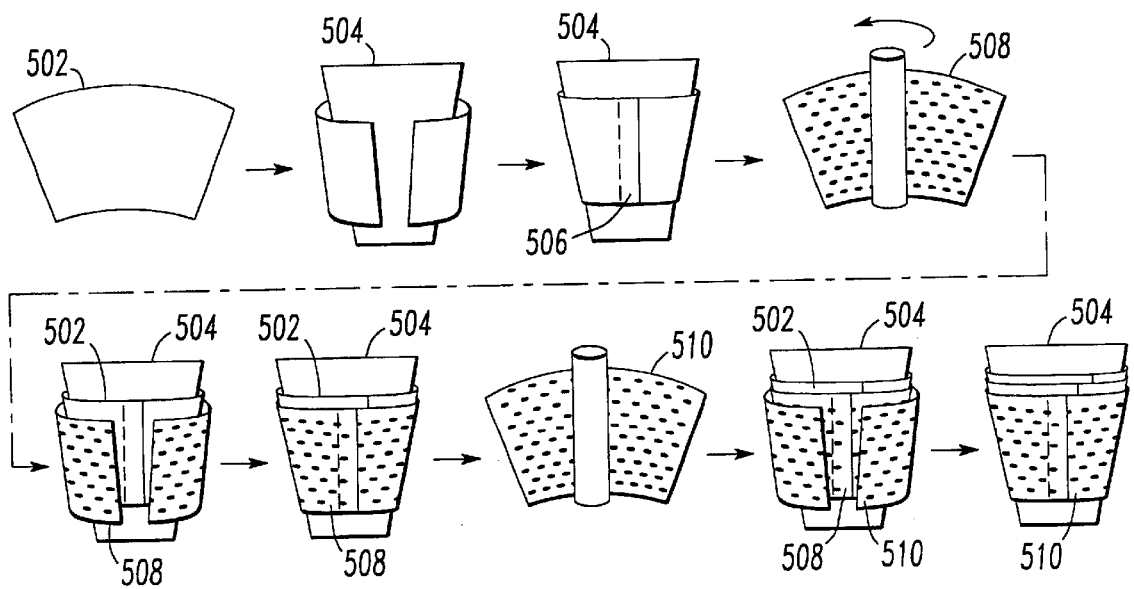
FIG. 5 is a schematic diagram of the process of forming the container of FIG. 3.
Figure 6:
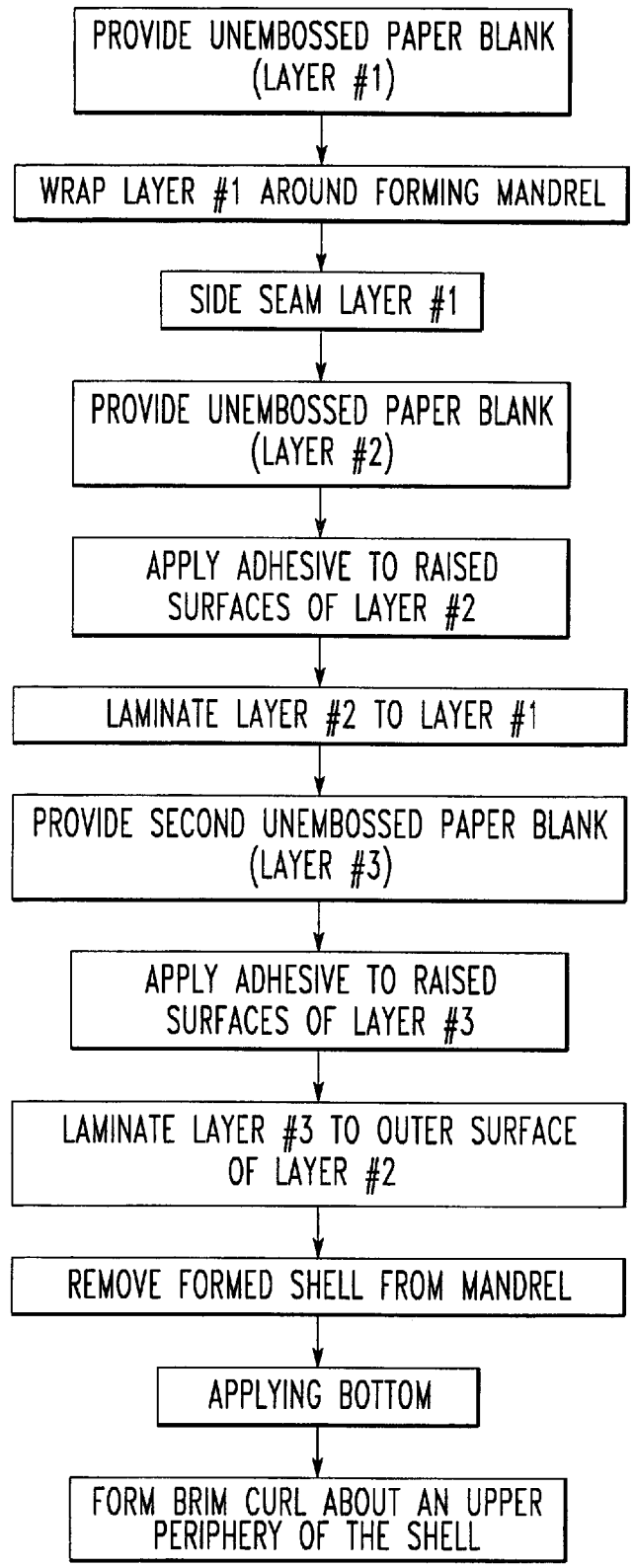
FIG. 6 is a flow diagram of the process illustrated in FIG. 5.

With reference now to FIGS. 5–15, the particular methods for manufacturing the composite paperboard containers discussed hereinabove are set forth in detail. It can be noted that in each of the embodiments, the container is formed by a build up of layers. With reference to FIGS. 5 and 6, when forming the container illustrated in FIG. 3, a first layer 502 in the form of an unembossed blank is wrapped around a forming mandrel 504 in a conventional manner. Once wrapped around the forming mandrel, the overlapping ends of the first layer 502 are side seamed in the area 506 to one another in a conventional manner. Once formed, the unembossed first layer 502 remains on the forming mandrel 504 and forms an inner layer of the container. Subsequently, an embossed paper blank 508 is provided with adhesive being applied to the raised or embossed areas prior to the embossed blank 508 being positioned around the forming mandrel 504. When positioned about the forming mandrel 504, the raised portions of the embossed layer 508 adhered to an outer surface of the unembossed layer 502 and thus forms an initial composite structure. In a manner similar to that carried out with the embossed layer 508, an adhesive is applied to the raised portions of a second embossed blank 510. With the adhesive applied to the raised portions of the blank 510, the blank is wrapped around the same mandrel 504 such that the raised portions of the third layer 510 adhere to an outer surface of what is now the intermediate layer 508. Once the layer 510 adhered to the previously formed layers, the shell can now be removed from the mandrel 504 such that a bottom and optional brim curl can be applied to the shell in order to form the container illustrated in FIG. 3.

As noted hereinabove, the container is formed by a build up process of layers in that due to the high flexural stiffness of the composite paperboard and low buckling resistance of the light weight paper does not permit the manufacturing of containers from a previously finished composite board in that such board can not readily be bent into the shape of the cups illustrated herein. Likewise, with each of the following embodiments, when forming cups, plates or bowls, it is preferred to build up a composite paperboard in layers around a mandrel or in the form of the shape of the products rather than form a composite paperboard material and subsequently attempt to shape it in to the form of the desired container.

With reference to FIG. 5, while the application of second and third embossed layers is illustrated therein, it may be readily appreciated by those skilled in the art that any number of embossed layers may be applied in order to achieve the desired stiffness and thermal resistivity. Additionally, any number of unembossed sheets may likewise be utilized in order to achieve the desired final product. Particularly, it may be desirable to apply a planar sheet to the outer surface of the formed shell which would better present indicia or other design characteristics printed on the paperboard material.

Figure 7:
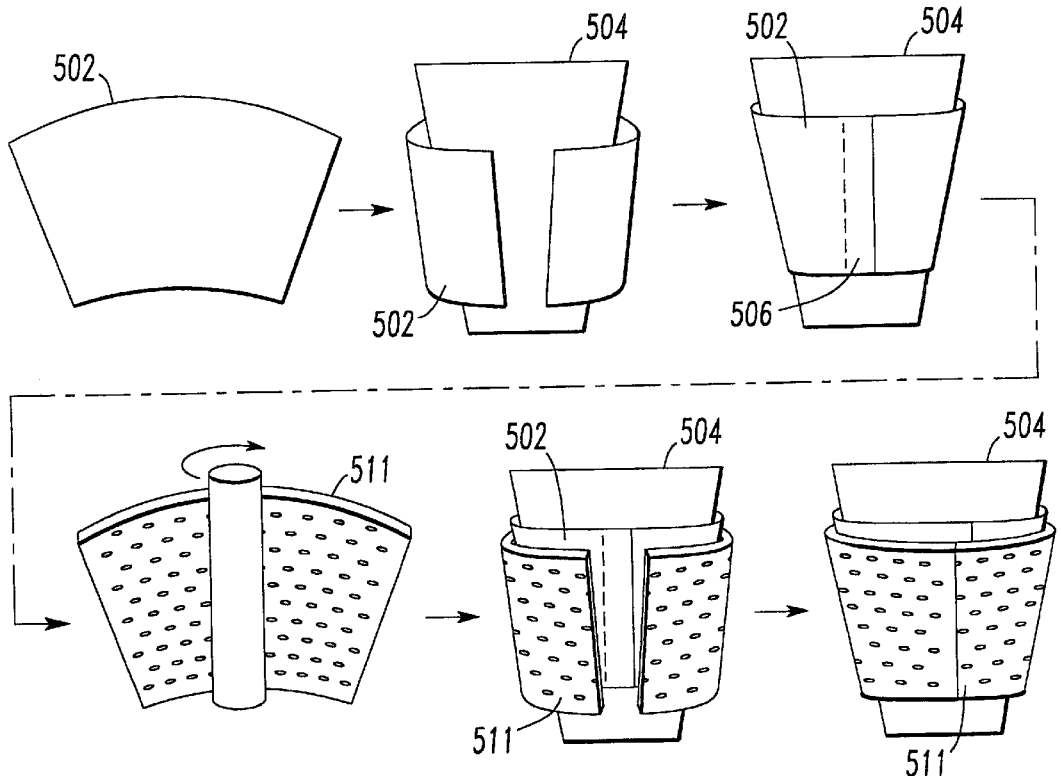
FIG. 7 is a schematic diagram of an alternative process for forming the container of FIG. 3.
Figure 8:
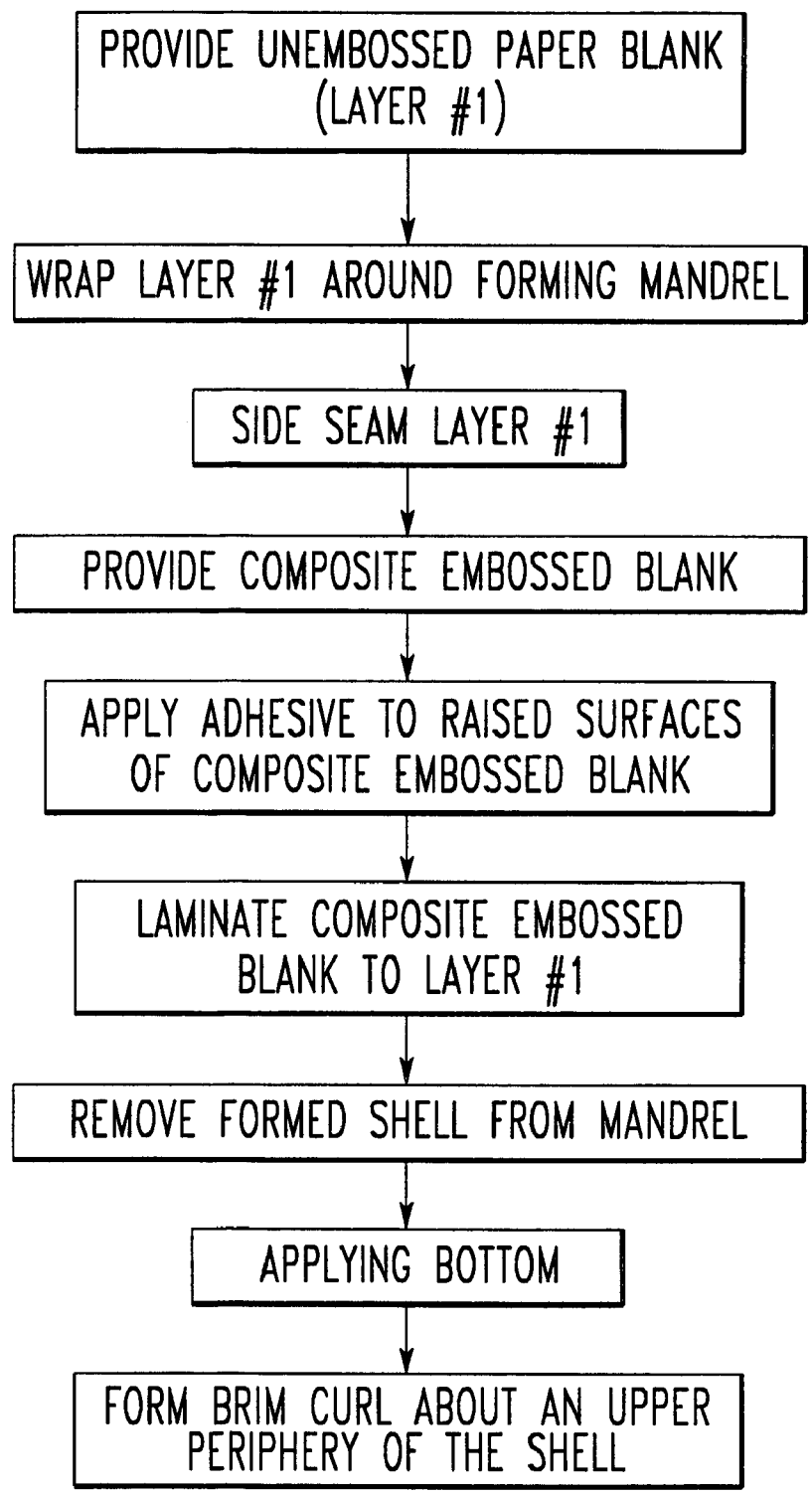
FIG. 8 is a flow diagram of the process illustrated in FIG. 7.
Figure 9:
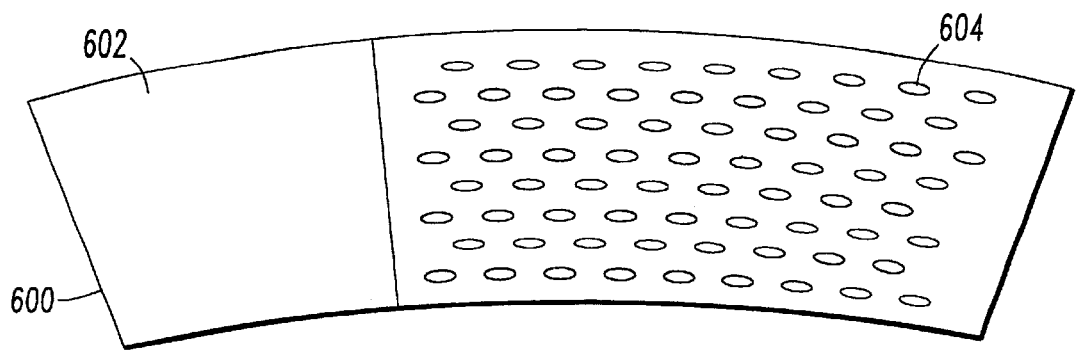
FIG. 9 is a schematic illustration of a unitary blank and for forming the container of FIG. 3.
Figure 10:
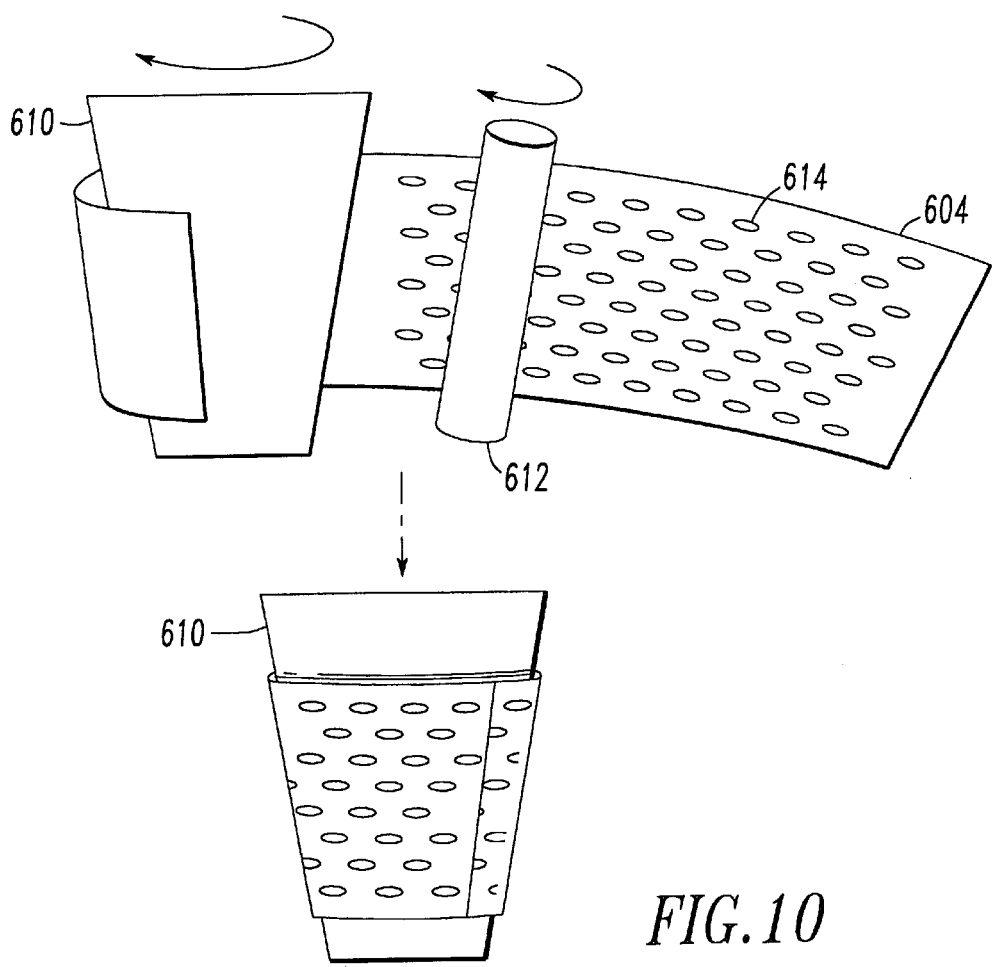
FIG. 10 is a schematic diagram of yet another alternative process of forming the container of FIG. 3.
Figure 11:
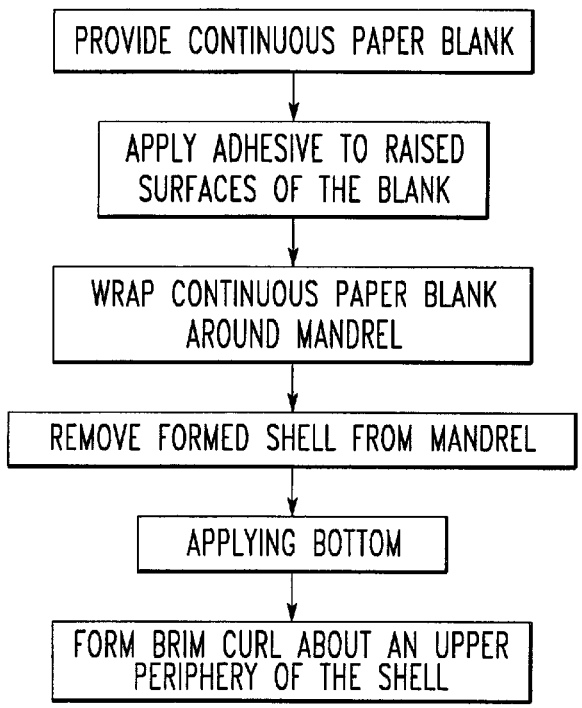
FIG. 11 is a flow diagram of the process illustrated in FIG. 9.
Figure 13:
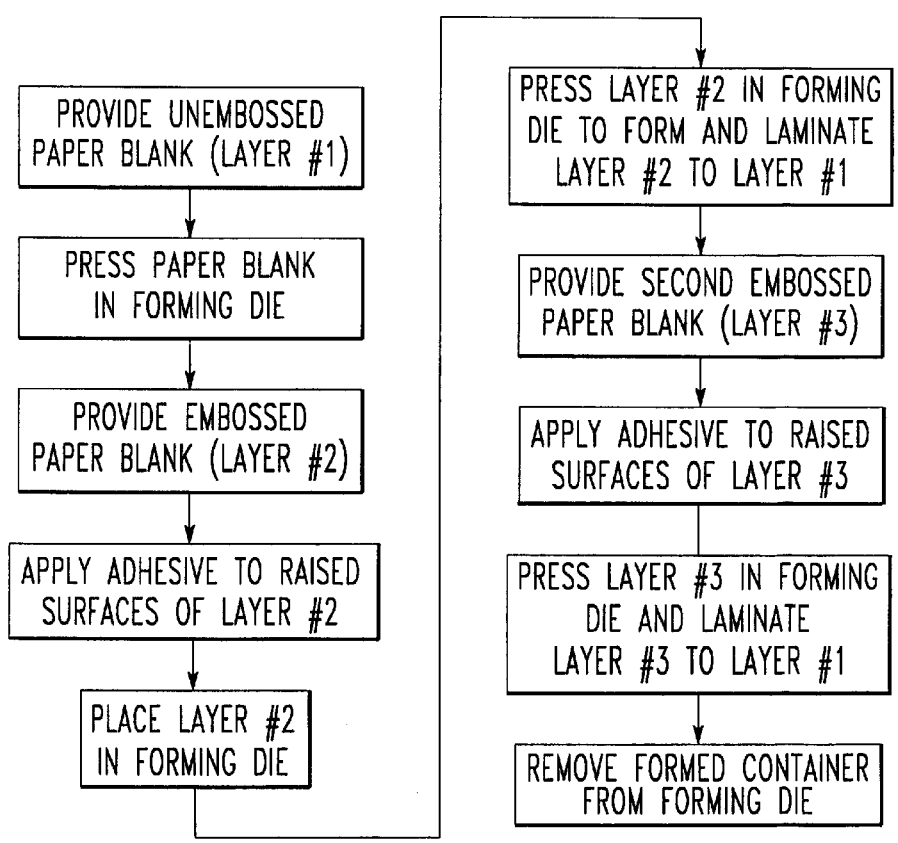
FIG. 13 is a flow diagram of the process illustrated in FIG. 12.

With reference now to FIGS. 7 and 8, an alternative embodiment to that discussed hereinabove will now to discussed in detail. The initial steps of this embodiment, that is, the providing of a substantially planar paper blank 502, the wrapping of the unembossed layer around a forming mandrel 504 and the side seaming of the layer 502 about the forming mandrel 504 and the area 506 are identical to that set forth hereinabove. With this embodiment, however, a composite web blank of two or more layers may be formed from a composite web, that is, manufactured in a known manner. Adhesive is then applied to the exposed raised portions of the composite blank 511 with this composite blank being wrapped about an outer surface of the layer 502 positioned on the mandrel 504. The shell formed by the composite blank 511 and unembossed blank 502 may then subsequently be removed from the forming mandrel 504 and a bottom and optional brim curl may then be formed thereon. Again, this being similar to that discussed hereinabove. It is noted that two or more layers may be previously combined to form the composite web 511, however, as noted hereinabove, it is imperative that local buckling within the inside layer be avoided and consequently the number of layers which make up the composite web 511 will be dependent upon the finished diameter of the paperboard container.

Referring now to FIGS. 9–12, yet another alternative process for forming the container illustrated in FIG. 3 is illustrated in detail. Initially, a unitary blank 600 is provided and includes both an unembossed region 602 as well as an embossed region 604. The unembossed region 602 is sized such that it forms one complete revolution about the forming mandrel 610 illustrated in FIG. 10. This forms an innermost layer of the container similar to that illustrated in the previous embodiments. Adhesive is applied by an adhesive applicator 612 to the raised portions 614 of the embossed area 604. Preferably, the embossed area 604 is of a length so as to encircle the mandrel at least twice, however, as will be appreciated by those skilled in the art, the actual length of the embossed section 604 may be of any length so as to form a container having any number of layers to achieve the desired strength and thermal resistivity.

Once the unitary blank 600 is formed about the mandrel 610, the shell may be removed in a manner similar to that set forth hereinabove such that a bottom and optional brim curl may be applied to the shell to form the container illustrated in FIG. 3.

Referring now to FIGS. 12–15, methods of forming the container illustrated in FIG. 1 will now be discussed in detail. Initially, it is noted that while the following methods are discussed with respect to the formation of a paper plate, similar methods would be utilized when forming bowls, trays and other similar types of containers of the above-noted composite material.

Figure 12:
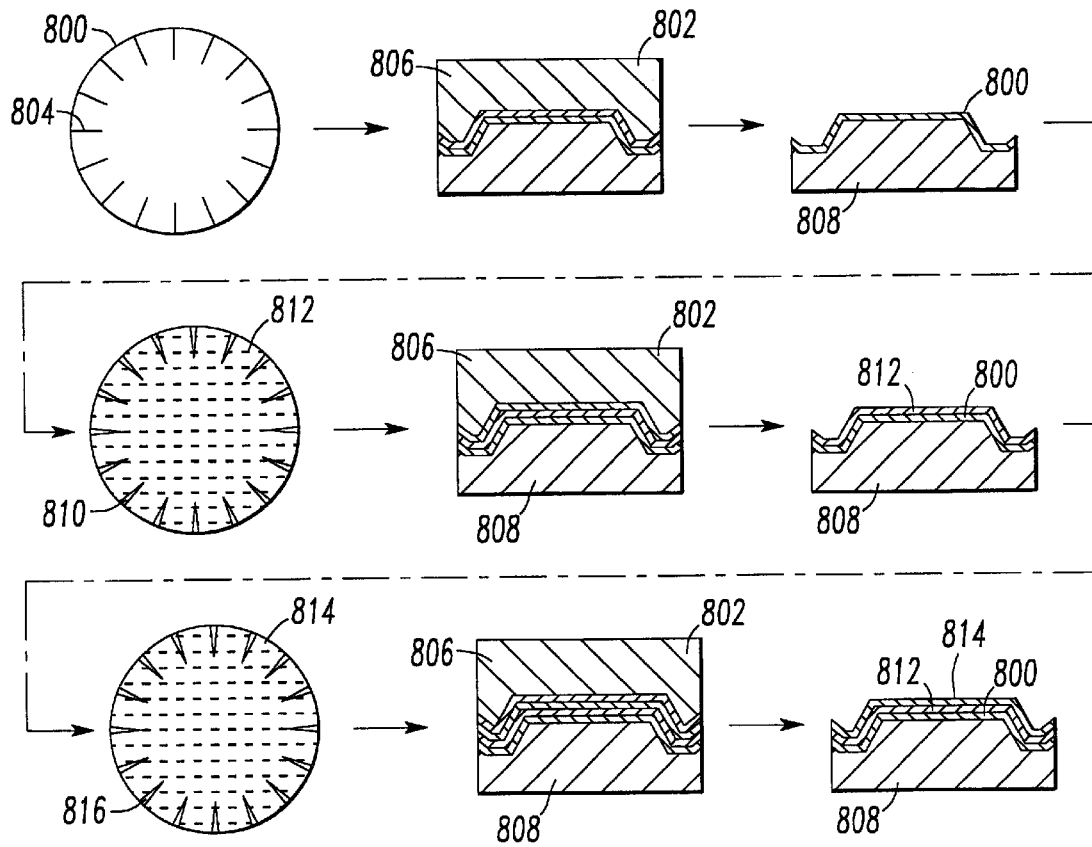
FIG. 12 is a schematic diagram of a process for forming the container of FIG. 1.

As illustrated in FIG. 12, initially, an unembossed blank 800 is positioned and pressed in a forming die 802. The unembossed blank 800 includes a plurality of scored lines 804 which dictate the positioning of pleats which are formed during the pressing process as is well-known in the art. It should be noted that the blank 800 is formed in the forming die 802 in an inverted manner that is with what is to be an exposed surface of the container facing downwardly which permits the remaining layers to be adhered to what is to be an underside of the container as will be discussed hereinbelow.

Once the blank 800 is formed in the forming die 802, an upper member 806 of the forming die is removed exposing an undersurface of the blank 800 which remains in the lower portion of the forming die 808.

Subsequently, an embossed paperboard blank 812 is provided and includes a plurality of radial slits or cuts 810 about a periphery thereof which permits the brim portion of the embossed blank to gather without accumulating excess amounts of paperboard material in these regions. An adhesive is applied to the raised portions of the embossed blank in a manner similar to that discussed hereinabove with the previous embodiments with the blank then being positioned in the forming die with the raised portions extending toward the formed blank already in the lower portion of the die 808. It should be noted that when positioning the embossed blank 812 in the forming die, the radial cut locations 810 of the embossed layer are offset from the pleated areas of the first layer. During the forming of the second embossed layer, light pressure is used by the forming press in order to avoid crushing the embossed areas. Then again, once formed, the upper portion 806 of the forming die 802 is removed thus exposing an under surface of the blank 812.

As with the previous blank 812, a second embossed blank 814 is provided and includes radial cuts 816 formed therein for the same purposes as that of the radial cuts 810 formed in the blank 812. Also, like the blank 812, adhesive is applied to the raised portions of the embossed blank with this blank then being positioned in the forming press 802 with the raised portions facing the blank 812 already in the press and again, light pressure is applied by the forming press in order to avoid crushing of the embossed areas while sufficiently laminating the layers together and forming the container illustrated in FIG. 1. Once formed, the upper portion 806 of the forming die is removed and the formed container removed from the forming die. As with the previous embodiments, one of ordinary skill in the art will appreciate that any number and combination of embossed and unembossed layers may be used in conjunction with the formation of the container illustrated in FIG. 1 and consequently the foregoing description is not intended to limit the application of the present invention to the particular combinations discussed herein.

Figure 14:
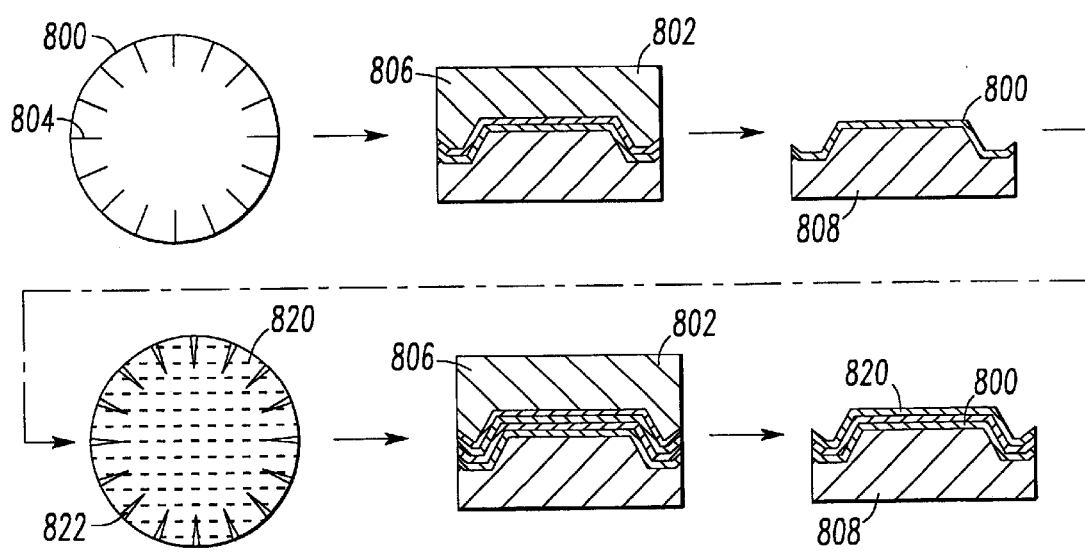
FIG. 14 is a schematic diagram of an alternative process for forming the container of FIG. 1.
Figure 15:
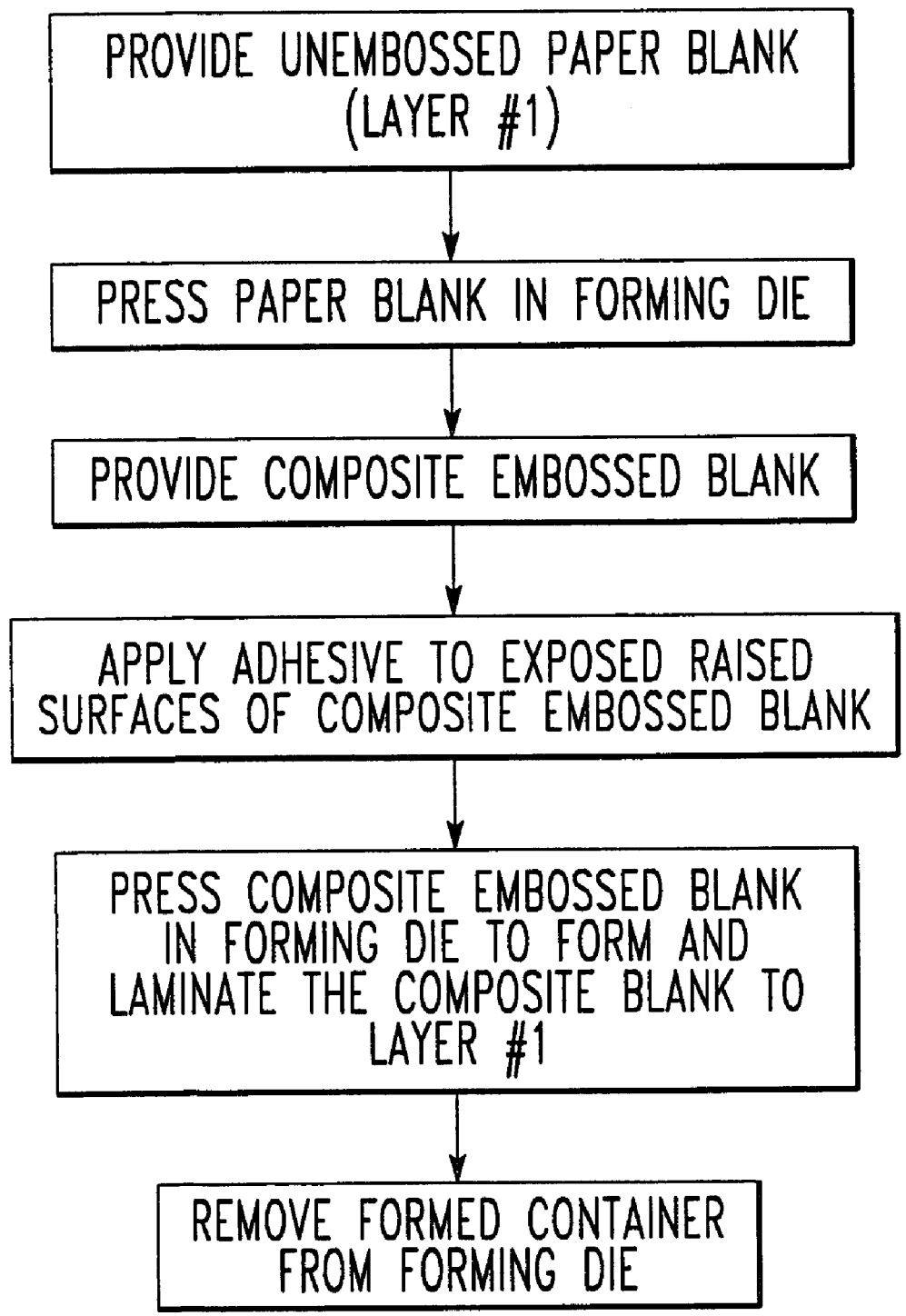
FIG. 15 is a flow diagram of the process illustrated in FIG. 14.

With reference now to FIGS. 14 and 15, an alternative embodiment for the formation of the paperboard container illustrated in FIG. 1 is set forth therein. Like the previous embodiment, an unembossed blank 800 is positioned and pressed in the forming die 802. The unembossed blank 800 includes the plurality of scored lines 804 which dictate the positioning pleats which are formed during the pressing process as is well-known in the art. Further, it should again be noted that the blank 800 is formed in the forming die 802 in an inverted manner which permits the remaining layers to be adhered to what is to be an underside of the container. Once the blank 800 is formed by the forming die 802, an upper member 806 of the forming die is removed exposing an under surface of the blank 800 which remains in the lower portion of the forming die 808. This portion of the alternative method being the same as that discussed hereinabove.

Subsequent to the forming of the unembossed blank 800, a composite embossed blank 820 is provided including radial cuts 822 formed therein in the manner similar to that discussed hereinabove. The composite blank 820 is formed of at least two embossed blanks which are previously adhered to one another by applying adhesive to the raised portions of one of the embossed layers. Once formed, the adhesive is applied to the exposed raised portions of the composite embossed blank 820 with this blank being positioned in the forming die 802 and impressed in a manner similar to that discussed hereinabove. Again, light pressure is used by the forming press in order to avoid crushing of the embossed areas. Once pressed, the upper portion of the die 806 is removed, thus exposing the container which may then be readily removed from a lower portion of the die 808. Again, as noted hereinabove, any number and combination of unembossed and composite embossed blanks may be utilized in forming the container in accordance with the present invention.

Various known coatings of the products formed from the composite paperboard material may be utilized and applied to the blanks in a known manner. Specifically, a moisture impervious coating would generally be applied to the unembossed layer in that this layer is the layer which is exposed to the contents of the containers. Similarly, printing can be readily applied to the outermost layer of the containers prior to their assembly in a known manner. Further, the numerous embossed patterns may be utilized so long as the requisite stiffness and thermal resistance is achieved.

Accordingly, paperboard cups, plates, bowls or trays formed from a composite paperboard material may be readily manufactured in accordance with the present invention. Such containers exhibit significantly higher flexural rigidity and thermal resistance than conventional paperboard containers. Further, such containers are more versatile than similar products formed from corrugated stock material.

While the present invention is being described with reference to preferred and alternative embodiments, it will be appreciated by those skilled in the art that the invention may be practiced otherwise than as specifically described herein without departing from the spirit and scope of the invention. It is therefore, to be understood that the spirit and scope of the invention be limited only by the appended claims.

What is claimed is:

1. A method of forming a composite paperboard container comprising the steps of:

providing a substantially planar sheet of paperboard material;

forming said planar sheet of paperboard material into a container configuration;

providing a first embossed sheet of paperboard material having a plurality of raised portions;

adhering said raised portions of said first embossed sheet of paperboard material to said container configuration formed by said planar sheet of paperboard material;

providing a second embossed sheet of paperboard material having a plurality of raised portions; and adhering said raised portions of said second embossed sheet of paperboard material to said first embossed sheet of paperboard material to form a container shell;

wherein said planar sheet of paperboard material, said first embossed sheet of paperboard material and said second embossed sheet of paperboard material are formed about a forming mandrel.

2. The method as defined in claim 1, wherein said first and second embossed sheets of paperboard material are adhered to one another before said first sheet of paperboard material is adhered to said planar sheet of paperboard material.

3. The method as defined in claim 1, wherein each sheet of paperboard material is of a basis weight in a range of 20 to 80 lbs/3000 sq. ft. ream.

4. The method as defined in claim 3, wherein each sheet of paperboard material is of a basis weight in a range of 30 to 50 lbs/3000 sq. ft. ream.

5. A method of forming a composite paperboard container comprising the steps of:

providing a substantially planar sheet of paperboard material;

forming said planar sheet of paperboard material into a container configuration;

providing a first embossed sheet of paperboard material having a plurality of raised portions;

adhering said raised portions of said first embossed sheet of paperboard material to said container configuration formed by said planar sheet of paperboard material;

providing a second embossed sheet of paperboard material having a plurality of raised portions; and adhering said raised portions of said second embossed sheet of paperboard material to said first embossed sheet of paperboard material to form a container shell; and securing a container bottom to said container shell.

6. The method as defined in claim 5, wherein each sheet of paperboard material is of a basis weight in a range of 20 to 80 lbs/3000 sq. ft. ream.

7. The method as defined in claim 6, wherein each sheet of paperboard material is of a basis weight in a range of 30 to 50 lbs/3000 sq. ft. ream.

8. The method as defined in claim 5, wherein the step of forming said container configuration includes forming said planar sheet of paperboard material and said first and second embossed sheets of paperboard material about a forming mandrel.

9. The method as defined in claim 8, further comprising the step of removing said container shell from said forming mandrel.

10. The method as defined in claim 5, wherein the step of forming said container configuration includes forming said planar sheet of paperboard material and said first and second sheets of embossed paperboard material in a forming die.

11. A method of forming a composite paperboard container having enhanced multi-directional rigidity comprising the steps of:

providing a substantially planar sheet of paperboard material;

forming said planar sheet of paperboard material into a container configuration;

providing at least one embossed sheet of paperboard material having a plurality of randomly spaced raised portions;

adhering substantially all of said plurality of randomly spaced raised portions of said embossed sheet of paperboard material to said container configuration formed by said planar sheet of paperboard material forming the composite paperboard container having enhanced multi-directional rigidity; and securing a container bottom to said composite paperboard container.

12. The method as defined in claim 11, wherein the step of forming said container configuration includes forming said planar sheet of paperboard material and said embossed sheet of paperboard material about a forming mandrel.

13. The method as defined in claim 11, wherein the step of forming said container configuration includes forming said planar sheet of paperboard material and said embossed sheet of paperboard material in a forming die.

14. A method of forming a composite paperboard container having enhanced multi-directional rigidity comprising the steps of:

providing a substantially planar sheet of paperboard material;

forming said planar sheet of paperboard material into a container configuration;

providing at least one embossed sheet of paperboard material having a plurality of randomly spaced raised portions; and adhering substantially all of said plurality of randomly spaced raised portions of said embossed sheet of paperboard material to said container configuration formed by said planar sheet of paperboard material forming the composite paperboard container having enhanced multi-directional rigidity;

wherein said planar sheet of paperboard material, said first embossed sheet of paperboard material and said second embossed sheet of paperboard material are formed about a forming mandrel.

15. The method as defined in claim 14, further comprising the step of removing said container shell from said forming mandrel.

16. The method as defined in claim 14, wherein each sheet of paperboard material is of a basis weight in a range of 20 to 80 lbs/3000 sq. ft. ream.

17. The method as defined in claim 16, wherein each sheet of paperboard material is of a basis weight in a range of 30 to 50 lbs/3000 sq. ft. ream.

* * * * *